(12) United States Patent
Hsia

(10) Patent No.: US 6,752,471 B2
(45) Date of Patent: Jun. 22, 2004

(54) STROLLER WHEEL STRUCTURE

(76) Inventor: Ben M. Hsia, 19401 Business Center Dr., Northridge, CA (US) 91324

(*) Notice: Subject to any disclaimer, the term of this patent is extended or adjusted under 35 U.S.C. 154(b) by 0 days.

(21) Appl. No.: 10/143,918

(22) Filed: May 13, 2002

(65) Prior Publication Data

US 2003/0209938 A1 Nov. 13, 2003

(51) Int. Cl.[7] ............................. B60B 5/02; A63C 17/22
(52) U.S. Cl. .............................. 301/64.701; 301/5.307; 301/64.704
(58) Field of Search .......................... 301/5.301, 5.303, 301/5.305, 5.306, 5.307, 64.701, 64.704, 64.705, 86, 87

(56) References Cited

U.S. PATENT DOCUMENTS

| | | | | |
|---|---|---|---|---|
| 4,447,093 A | * | 5/1984 | Cunard et al. | 301/64.704 |
| 4,592,595 A | * | 6/1986 | Freeman | 301/5.308 |
| 5,174,633 A | * | 12/1992 | Kidd et al. | 301/64.701 |
| 5,934,763 A | * | 8/1999 | Conradsson et al. | 301/64.701 |
| 6,050,648 A | * | 4/2000 | Keleny | 301/64.701 |
| 6,629,735 B1 | * | 10/2003 | Galy | 301/5.307 |
| 6,655,747 B2 | * | 12/2003 | Young et al. | 301/5.301 |

* cited by examiner

*Primary Examiner*—S. Joseph Morano
*Assistant Examiner*—Jason R. Bellinger
(74) *Attorney, Agent, or Firm*—Raymond Y. Chan; David and Raymond Patent Group

(57) ABSTRACT

A stroller wheel structure includes a wheel frame and a stroller wheel coaxially mounted thereto. The wheel frame includes a hub body for rotatably mounting to a stroller and a ring shaped rim body, which is coaxially mounted to the hub body, having a first side, an opposed second side, and a plurality of transverse through slots spacedly provided on the rim body to communicate the first side with the second side. The stroller wheel includes a solid core wheel body having a ring shaped coaxially mounted on the rim body, two spaced apart sidewalls radially extended from inner circumferential edges of the wheel body to cover the first and second sides of the rim body respectively, and a plurality of reinforcing ribs integrally extended between the sidewalls through the transverse through slots of the rim body respectively, so as to substantially mount the stroller wheel around the wheel frame.

20 Claims, 5 Drawing Sheets

US 6,752,471 B2

STROLLER WHEEL STRUCTURE

BACKGROUND OF THE PRESENT INVENTION

1. Field of Invention

The present invention relates to a stroller, and more particularly to a stroller wheel structure, which can provide a simple and rigid support for the stroller so as to prolong the service life span and minimize the manufacturing cost of the stroller.

2. Description of Related Arts

A stroller becomes a necessity to every family having a young child or baby and is considered as a convenient tool to carry the baby or young child from place to place such as foot traveling and shopping. It is known that each stroller comprises stroller wheels to enhance the mobility of the stroller.

The stroller generally comprises a hub connected to the stroller frame in order to rotatably mount the stroller wheels to a stroller frame. Accordingly, there are mainly two types of stroller wheels, which are the solid core wheel and the inflatable wheel.

The solid core wheel is made of foaming material and commonly manufactured by the plastic molding technique. Since the solid core wheel is relatively economical and easy to manufacture, most manufacturer should like to install the solid core wheel to the stroller. Moreover, the solid core wheel is durable and prolongs the service life span of the stroller. However, the solid core wheel has a major drawback. In order to mount the solid core wheels on the hub, the hub must have an outer circumferential surface to engage with an inner circumferential side of the solid core wheel respectively, as shown in FIG. 1A. However, a rotational force generated from each solid core wheel will tend to pull the wheel out of the hub. In other words, the solid core wheel may be detached from the stroller accidentally. Since the baby is soft and weak, any mistake may cause unwanted injury to the baby.

As shown in FIG. 1B, the inflatable wheel generally comprises a rim having a stem hole coaxially mounted on the end of the hub, a wheel tire encirclingly mounted on the rim, and an inflatable bladder received in the wheel tire. The inflatable bladder comprises a valve stem extended to an exterior of the rim through the stem hole. A main advantage of the inflatable wheel is to provide a better gripping force between the wheel tire and the ground so as to prevent the stroller from skidding accidentally. However, such complicated structure of the inflatable wheel will highly increase the cost of the stroller. Moreover, the user may merely check the wheel pressure of the inflatable wheel to ensure the best and safe performance of the inflatable wheel.

SUMMARY OF THE PRESENT INVENTION

A main object of the present invention is to provide a stroller wheel structure which enhances the endurance of the wheel for the stroller in a cost effective way, so as to prolong the service life span of the stroller.

Another object of the present invention is to provide a stroller wheel structure, wherein the solid core wheel is integrally mounted on the hub to provide a rigid support of the stroller. In other words, the vibrating force generated from the rotational movement of the wheel will not damage the attachment between the hub and the wheel, so as to prevent the stroller wheel from being detached from the stroller accidentally.

Another object of the present invention is to provide a stroller wheel structure, wherein the wheel body is made of elastic material for providing a cushion effect of the stroller wheel structure so as to enhance the comfortability of the stroller.

Another object of the present invention is to provide a stroller wheel structure, wherein the manufacturing process of the wheel is extremely simple and easy by the conventional technology, so as to reduce the manufacturing cost of the stroller incorporating with the stroller wheel structure of the present invention.

Another object of the present invention is to provide a stroller wheel structure, wherein no expensive or complicate mechanical structure is required to be employed in the present invention in order to achieve the above mentioned objects. Therefore, the present invention substantially provides an economic and efficient solution for attaching to the wheel to the stroller and providing reinforced support configuration to the stroller.

Accordingly, in order to accomplish the above objects, the present invention provides a stroller wheel structure for a stroller, comprising:

a wheel frame comprising a hub body for rotatably mounting to the stroller and a ring shaped rim body, which is coaxially mounted to the hub body, having a first side, an opposed second side, and a plurality of transverse through slots spacedly provided around an outer peripheral portion of the rim body to communicate the first side with the second side; and a stroller wheel comprising a solid core wheel body, having a ring shape, coaxially mounted on the rim body, two spaced apart sidewalls radially extended from inner circumferential edges of the wheel body to cover the first and second sides of the rim body respectively, and a plurality of reinforcing ribs integrally extended between the sidewalls through the transverse through slots of the rim body respectively, so as to substantially mount the stroller wheel around the wheel frame.

DETAILED DESCRIPTION OF THE PREFERRED EMBODIMENT

Figure 1A:
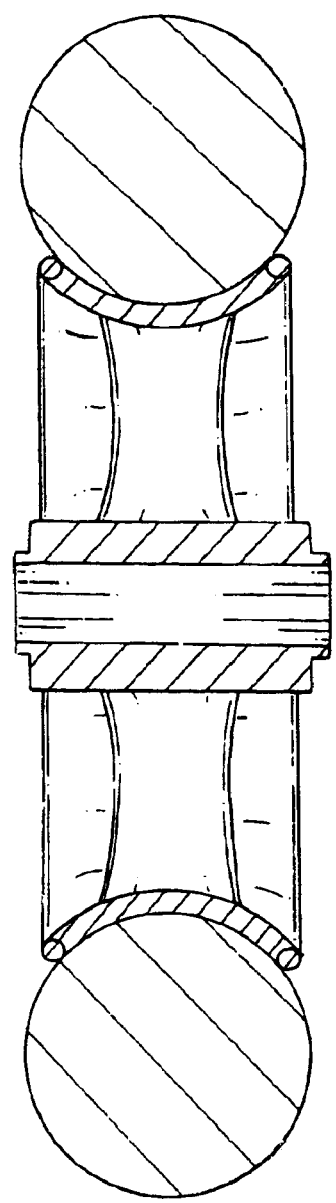
FIG. 1A illustrates a conventional solid core stroller wheel for a stroller.
Figure 1B:
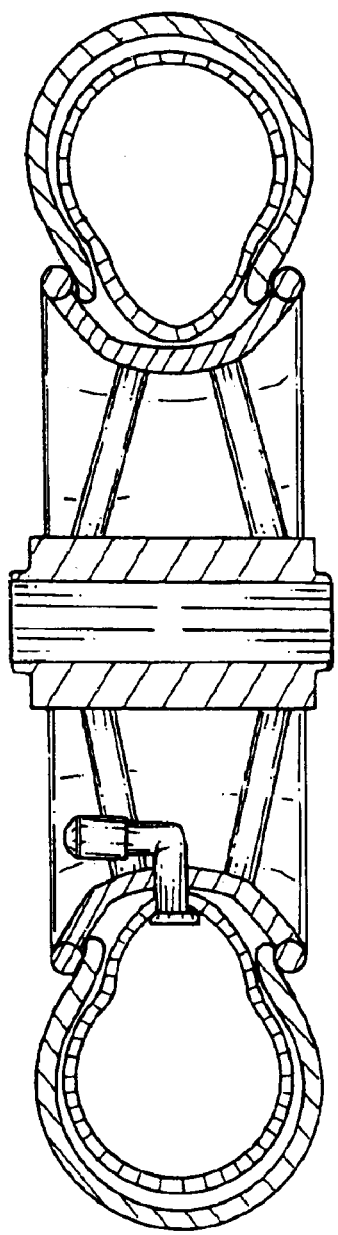
FIG. 1B illustrates a conventional inflatable stroller wheel for a stroller.
Figure 2:
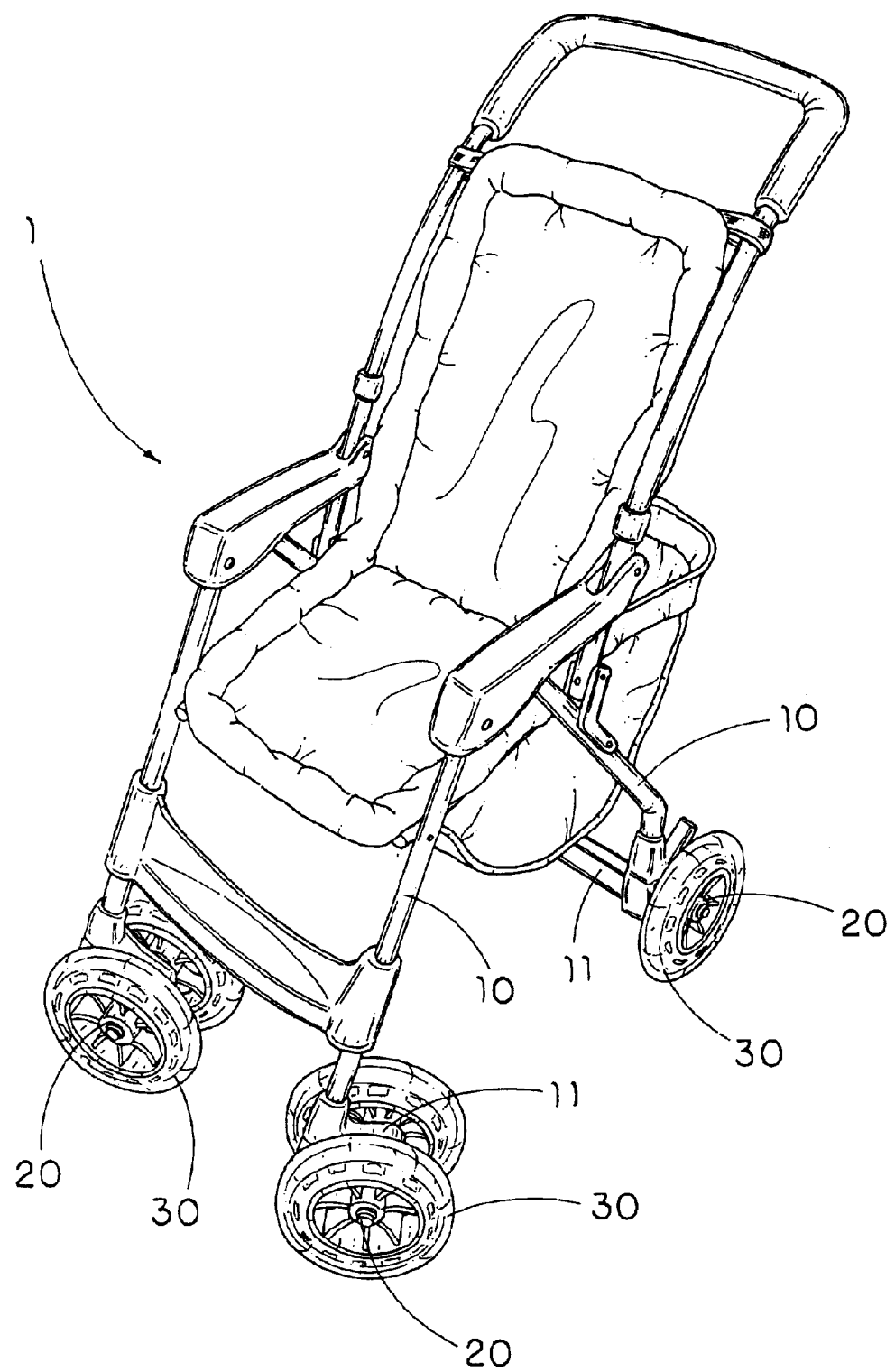
FIG. 2 is a perspective view of a stroller incorporated with a stroller wheel structure according to a preferred embodiment of the present invention.

Referring to FIG. 2 of the drawings, a stroller wheel structure for a stroller according to a preferred embodiment of present invention is illustrated. The stroller 1, such as a conventional stroller, comprises a leg frame 10 wherein the stroller wheel structure is rotatably mounted to the leg frame 10 of the stroller 1.

Figure 3:
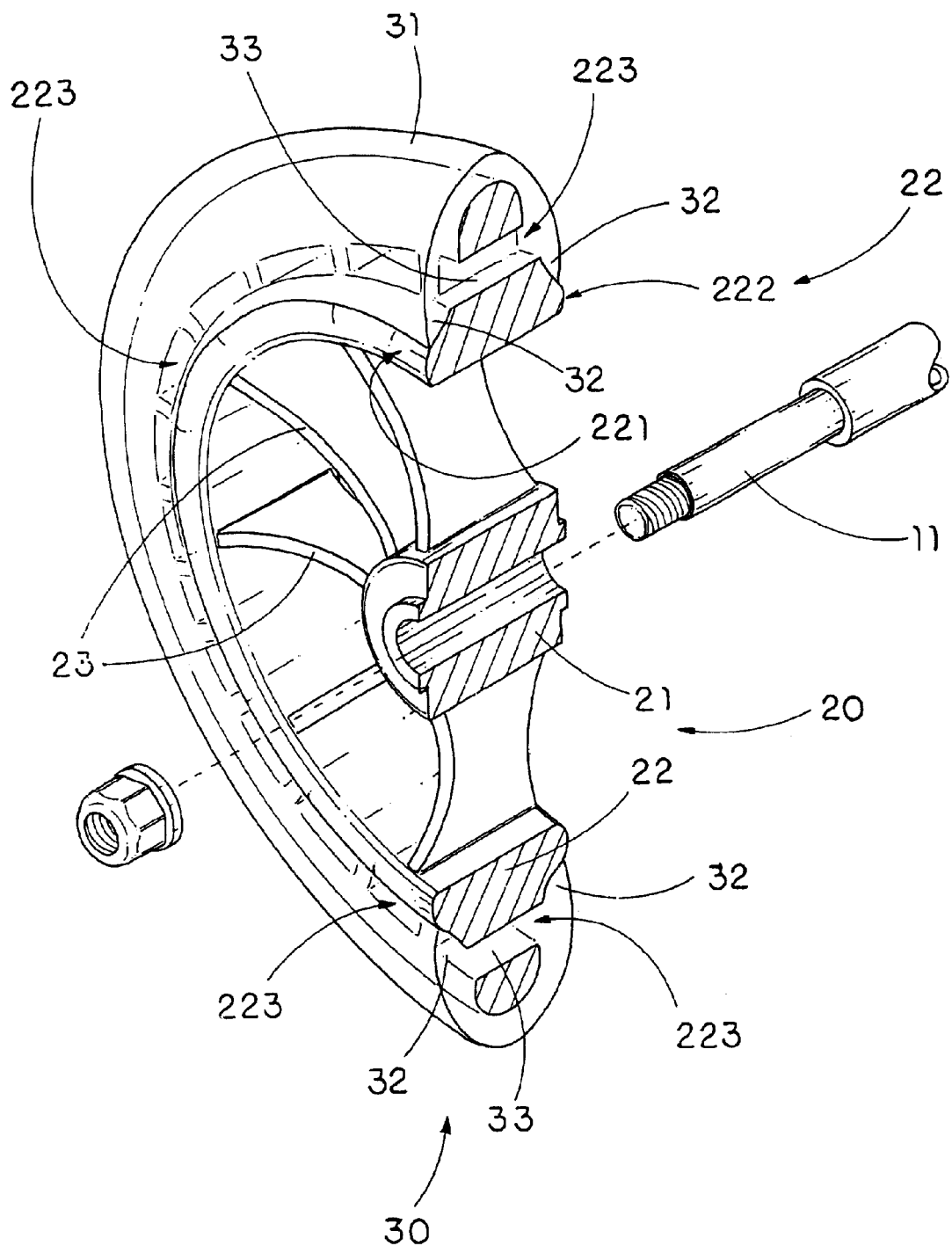
FIG. 3 is a sectional perspective view of the stroller wheel structure according to the above preferred embodiment of the present invention.

As shown in FIG. 3, the stroller wheel structure comprises a wheel frame 20, which comprises a hub body 21 for rotatably mounting to the stroller 1 and a ring shaped rim body 22, which is coaxially mounted to the hub body 21, having a first side 221, an opposed second side 222, and a plurality of transverse through slots 223 spacedly provided around an outer peripheral portion of the rim body 22 to communicate the first side 221 with the second side 222.

The stroller wheel structure further comprises a stroller wheel 30, which comprises a solid core wheel body 31, having a ring shape, coaxially mounted on the rim body 22, two spaced apart sidewalls 32 radially extended from two inner circumferential edges of the wheel body 31 to cover the first and second sides 221, 222 of the rim body 22 respectively, and a plurality of reinforcing ribs 33 integrally extended between the sidewalls 32 to pass through and fill the transverse through slots 223 of the rim body 22, so as to substantially mount the stroller wheel 30 around the wheel frame 20.

According to the preferred embodiment, the wheel frame 20 is preferably made of lightweight but rigid material such as alloy or high intensity polyethylene wherein the wheel frame 20 is arranged to rotatably connect to the leg frame 10 of the stroller 1 by means of a wheel axle 11 rotatably passing through the hub body 22. As shown in FIG. 3, the wheel frame 20 further comprises a plurality of spokes 23 integrally and radially extended from the hub body 21 to the rim body 22 so as to provide a rigid structure of the wheel frame 20. It is worth mentioning that the wheel frame 20 is adapted to be constructed to form a one piece member by conventional plastic making technology.

The rim body 22 further has an outer circumferential surface and an inner circumferential surface wherein the outer circumferential surface of the rim body 22 is arranged to substantially bias against an inner circumferential surface of the wheel body 31. Thus, the spokes 23 are evenly extended from the inner circumferential surface of the rim body 22 to an outer circumferential surface of the hub body 21.

Accordingly, the rim body 22, having a tapered cross sectional shape, has a width gradually reducing in an outwardly radial direction. In other words, a distance between the first and second sides 221, 222 of the rim body 22 is gradually decreased from the inner circumferential surface of the rim body 22 towards the outer circumferential surface thereof.

The transverse through slots 223 are spacedly and circularly aligned and coaxially and evenly provided on the rim body 22 wherein each of the transverse through slots 223 is an elongated slot horizontally extended from the first side 221 of the rim body 22 to the second side 222 thereof.

As shown in FIG. 3, the wheel body 31 is mounted on the outer circumferential surface of the rim body 22, wherein an inner diameter of the wheel body 31 equals to an outer diameter of the rim body 22 in such a manner that when the wheel body 31 is coaxially mounted around the rim body 22, an inner circumferential surface of the wheel body 31 is substantially biased against an outer circumferential surface of the rim body Each of the reinforcing ribs 33 is shaped and sized corresponding to the shape and size of the transverse through slot 223 wherein the reinforcing ribs 33 are fittedly passed through the transverse through slots 223 respectively so as to retain the wheel body. 31 on the rim body 22. Accordingly, the reinforcing ribs 33 are filled in the transverse through slots 223 and adapted to not only substantially increase the rigid structure of the rim body 22 but also securely interlock the wheel body 31 on the rim body 22.

The stroller wheel 30 is made of deformable material such as polyurethane (PU) that has elastic ability to absorb a vibration while a rotational force is applied on the stroller wheel 30. Preferably, an outer diameter of the wheel body 31 should be at least 5 inches so as to substantially support the stroller 1.

Figure 4:
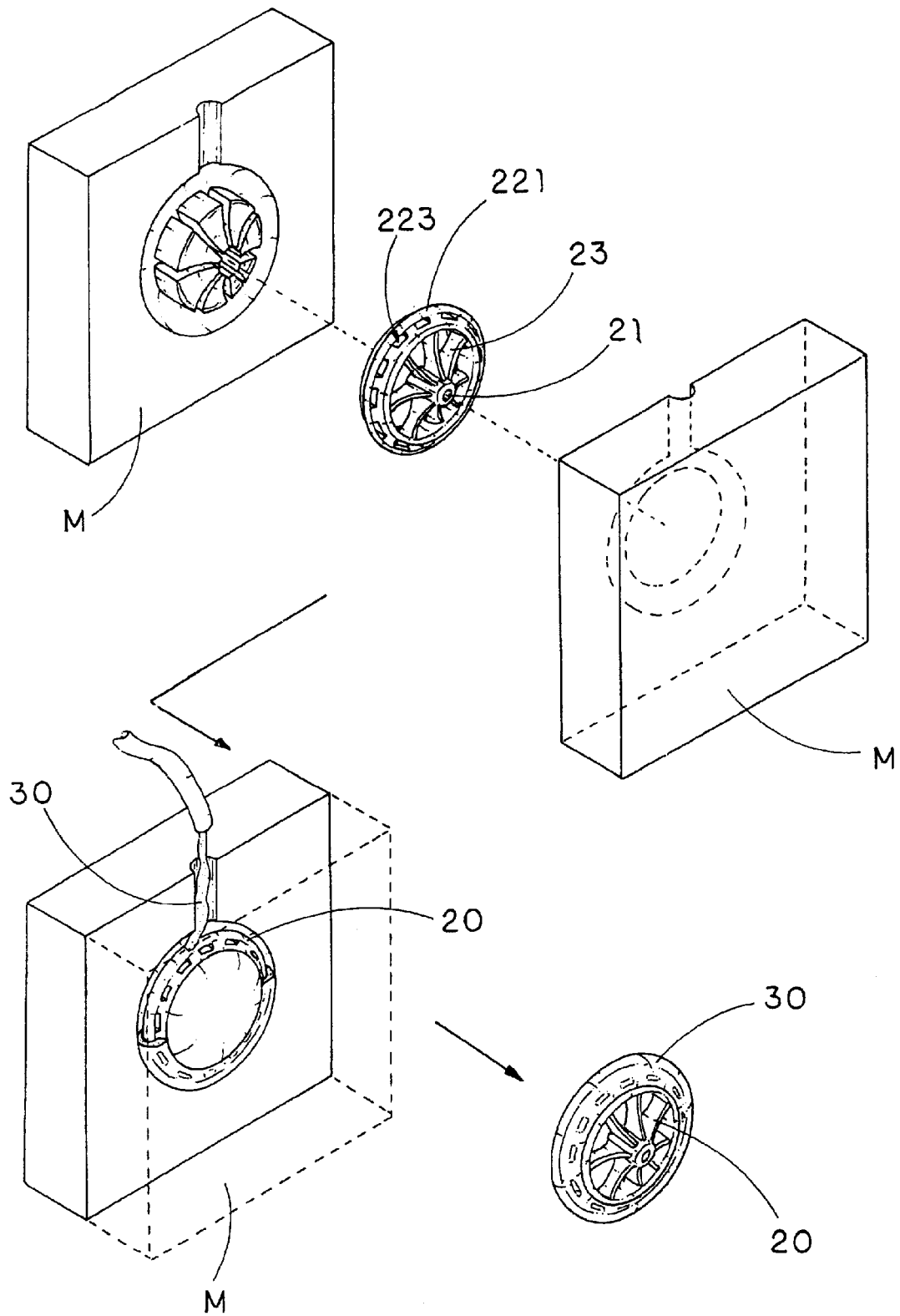
FIG. 4 illustrates a manufacturing process of mounting a stroller wheel around a wheel frame to form the stroller wheel structure according to the above preferred embodiment of the present invention.

Accordingly, the stroller wheel 30 is formed by applying a liquefied form material on the rim body 22 in a mold M until the liquefied form material fills in all the transverse through slots 223 of the rim body 22 and then solidifying the liquefied form material to form the wheel body 31 extending around the rim body 22 and to form the reinforcing ribs 33 extended through the transverse through slots 223 respectively, as shown in FIG. 4. In other words, the stroller wheel 30 is built-in with the wheel frame 20 to form an integral one piece structure so as to ensure the interlocking attachment between the stroller wheel 30 and the wheel frame. Therefore, no further process is required to assemble the stroller wheel 30 to wheel frame 20, so as to minimize the manufacturing cost of the stroller 1.

It is worth mentioning that when utilizing the stroller 1, a downward force and a rotational force are substantially applied on the stroller wheel structure of the present invention. Since the outer circumferential surface of the rim body 22 is substantially biased against the inner circumferential surface of the wheel body 31, the downward force applied on the wheel body 31 evenly distributes to the wheel frame 20. Thus, the solid core wheel body 31 is adapted to substantially support the stroller 1 without distorting the shape of the stroller wheel 30. Moreover, the stroller wheel 30 is securely interlocked with the wheel frame 20 by means of the reinforcing ribs 223 in such a manner that when the rotational force is applied on the stroller wheel 30, the wheel body 31 is retained on the rim body 22 in position, so as to prevent the stroller wheel 30 from being detached from the wheel frame 20 accidentally.

What is claimed is:

1. A stroller wheel structure for a stroller, comprising:

a wheel frame comprising a hub body for rotatably mounting to said stroller and a ring shaped rim body coaxially mounted on said hub body, wherein said rim body has a first side, an opposed second side, and a plurality of transverse through holes spacedly provided between an outer peripheral portion and an inner peripheral portion of said rim body and aligned circularly around said outer peripheral portion of said rim body, wherein each of said transverse through holes is transversally extended from said first side to said second side; and a stroller wheel comprising a solid core wheel body, having a ring shape, coaxially covering said outer peripheral portion of said rim body, two spaced apart sidewalls radially extended from inner circumferential edges of said wheel body to cover said first and second sides of said rim body respectively, and a plurality of reinforcing ribs integrally extending between said first and second sidewalls and penetrating through and filling said transverse through holes of said rim body respectively, so as to substantially mount said stroller wheel around said wheel frame.

2. The stroller wheel structure, as recited in claim 1, wherein an inner diameter of said wheel body equals to an outer diameter of said rim body, wherein when said wheel body is coaxially mounted around said rim body, an inner circumferential surface of said wheel body is substantially biased against an outer circumferential surface of said rim body.

3. The stroller wheel structure, as recited in claim 1, wherein each of said transverse through holes is an elongated slot horizontally extended from said first side of said rim body to said second side thereof.

4. The stroller wheel structure, as recited in claim 2, wherein each of said transverse through holes is an elongated slot horizontally extended from said first side of said rim body to said second side thereof.

5. The stroller wheel structure, as recited in claim 1, wherein said rim body has a tapered shape and a width gradually reducing in an outwardly radial direction.

6. The stroller wheel structure, as recited in claim 3, wherein said rim body has a tapered shape and a width gradually reducing in an outwardly radial direction.

7. The stroller wheel structure, as recited in claim 4, wherein said rim body, having a tapered shaped, has a width gradually reducing in an outwardly radial direction.

8. The stroller wheel structure, as recited in claim 3, wherein said transverse through holes are circularly and coaxially aligned and spacedly and evenly provided on said rim body.

9. The stroller wheel structure, as recited in claim 4, wherein said transverse through holes are circularly and coaxially aligned and spacedly and evenly provided on said rim body.

10. The stroller wheel structure, as recited in claim 6, wherein said transverse through holes are circularly and coaxially aligned and spacedly and evenly provided on said rim body.

11. The stroller wheel structure, as recited in claim 7, wherein said transverse through holes are circularly and coaxially aligned and spacedly and evenly provided on said rim body.

12. The stroller wheel structure, as recited in claim 1, wherein said stroller wheel is made from a liquefied form material which is applied on said rim body until said liquefied form material fills in all said transverse through holes of said rim body and solidified to form said wheel body on said circumferential surface of said rim body and said reinforcing ribs in said transverse through holes respectively.

13. The stroller wheel structure, as recited in claim 3, wherein said stroller wheel is made from a liquefied form material which is applied on said rim body until said, liquefied form material fills in all said transverse through holes of said rim body and solidified to form said wheel body on said circumferential surface of said rim body and to form said reinforcing ribs in said transverse through holes respectively.

14. The stroller wheel structure, as recited in claim 5, wherein said stroller wheel is made from a liquefied form material which is applied on said rim body until said liquefied form material fills in all said transverse through holes of said rim body and solidified to form said wheel body on said circumferential surface of said rim body and said reinforcing ribs in said transverse through holes respectively.

15. The stroller wheel structure, as recited in claim 7, wherein said stroller wheel is made from a liquefied form material which is applied on said rim body until said liquefied form material fills in all said transverse through holes of said rim body and solidified to form said wheel body on said circumferential surface of said rim body and said reinforcing ribs in said transverse through holes respectively.

16. The stroller wheel structure, as recited in claim 11, wherein said stroller wheel is made from a liquefied form material which is applied on said rim body until said liquefied form material fills in all said transverse through holes of said rim body and solidified to form said wheel body on said circumferential surface of said rim body and said reinforcing ribs in said transverse through holes respectively.

17. A stroller wheel structure, as recited in claim 4, wherein said wheel frame is made of elastic material adapted for absorbing a vibrating force of said stroller.

18. A stroller wheel structure, as recited in claim 7, wherein said wheel frame is made of elastic material adapted for absorbing a vibrating force of said stroller.

19. A stroller wheel structure, as recited in claim 11, wherein said wheel frame is made of elastic material adapted for absorbing a vibrating force of said stroller.

20. A stroller wheel structure, as recited in claim 16, wherein said wheel frame is made of elastic material adapted for absorbing a vibrating force of said stroller.

* * * * *